(12) United States Patent
Izumi

(10) Patent No.: US 7,377,660 B2
(45) Date of Patent: May 27, 2008

(54) PHOTOGRAPHING ASSISTING APPARATUS, PHOTOGRAPHING METHOD, AND PHOTOGRAPHING SYSTEM

(75) Inventor: Yoshihiro Izumi, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 237 days.

(21) Appl. No.: 11/012,264

(22) Filed: Dec. 16, 2004

(65) Prior Publication Data

US 2005/0134692 A1    Jun. 23, 2005

(30) Foreign Application Priority Data

Dec. 18, 2003   (JP)   ............... 2003-420860

(51) Int. Cl.
    *G03B 15/02*   (2006.01)
(52) U.S. Cl. ............... 362/3; 396/4; 396/5; 362/8; 362/16
(58) Field of Classification Search ............... 362/3, 362/5, 7, 16, 17, 18; 348/207.99; 396/4, 396/5, 267, 544
    See application file for complete search history.

(56) References Cited

U.S. PATENT DOCUMENTS

| | | | | |
|---|---|---|---|---|
| 3,165,025 | A * | 1/1965 | Hart | 355/64 |
| 3,737,226 | A * | 6/1973 | Shank | 355/67 |
| 5,704,702 | A * | 1/1998 | Goto | 362/5 |
| 6,106,124 | A * | 8/2000 | Tarsia | 362/6 |
| 6,609,803 | B2 * | 8/2003 | Lichfield | 362/16 |
| 6,672,737 | B2 * | 1/2004 | Lai et al. | 362/240 |
| 7,055,976 | B2 * | 6/2006 | Blanford | 362/16 |
| 7,194,200 | B1 * | 3/2007 | Behlow | 396/5 |

FOREIGN PATENT DOCUMENTS

| | | |
|---|---|---|
| JP | 04-070274 | 3/1992 |
| JP | 4-107240 U | 9/1992 |
| JP | 05-158149 | 6/1993 |
| JP | 8-135894 A | 5/1996 |
| JP | 8-205012 A | 8/1996 |
| JP | 09-133946 | 5/1997 |
| JP | 9-284623 A | 10/1997 |
| JP | 11-344707 A | 12/1999 |
| JP | 2000-075363 | 3/2000 |
| JP | 2002-14342 A | 1/2002 |
| JP | 2003-77323 A | 3/2003 |
| JP | 2003-162978 A | 6/2003 |
| JP | 2003-169192 A | 6/2003 |

* cited by examiner

*Primary Examiner*—Anabel M Ton
(74) *Attorney, Agent, or Firm*—Nixon & Vanderhye, P.C.

(57) ABSTRACT

A photographing assisting apparatus is used when a subject is photographed using a photographing apparatus. The photographing assisting apparatus has a planar light source that, while in a state covering a to-be-photographed area on the subject, shines light on the to-be-photographed area on the subject and that is translucent in the direction pointing from the to-be-photographed area on the subject to the photographing apparatus, and a support portion that supports the photographing apparatus such that the distance between the subject and the photographing apparatus is kept fixed. The photographing assisting apparatus permits the subject to be illuminated with more evenly distributed brightness and permits a given illumination condition of the subject to be obtained stably.

11 Claims, 4 Drawing Sheets

PHOTOGRAPHING ASSISTING APPARATUS, PHOTOGRAPHING METHOD, AND PHOTOGRAPHING SYSTEM

This nonprovisional application claims priority under 35 U.S.C. § 119(a) on Patent Application No. 2003-420860 filed in Japan on Dec. 18, 2003, the entire contents of which are hereby incorporated by reference.

BACKGROUND

1. Technical Field

The exemplary embodiments disclosed herein relate to a photographing assisting apparatus that is used in combination with a photographing apparatus of any kind (for example, a camera of any kind such as a digital camera (including a camera-equipped portable appliance), film camera, or video camera, or an electronic image-sensing device of any kind such as a CCD imager, CMOS imager, or TFT imager) when a subject is photographed using the photographing apparatus, and relates also to a photographing method for photographing a subject using a photographing apparatus of any kind. More particularly, the exemplary embodiments relate to a photographing assisting apparatus and a photographing method that are useful in macro (close-up) photography. The exemplary embodiments relate further to a photographing system provided with a photographing apparatus and a photographing assisting apparatus as mentioned above.

2. Description of Related Art

Today, one common use of a camera is to photograph documents, business cards, and the like instead of copying them. When documents and the like are photographed using a camera, the distance between the subject and the camera is short, and so-called macro (close-up) photography therefore needs to be performed.

Such macro photography presents the following problems.

Typically used as an illumination light source in combination with a camera of any kind such as a digital camera is a built-in flash incorporated in the camera body or an external flash that is detachably attached to the camera body. When a flash is used as an auxiliary light source in macro photography, however, the subject is irradiated with flash light from a very close distance. It is therefore difficult to control the amount of light emitted and to shine light evenly over the entire area to be photographed. This tends to result in uneven exposure in the photographed image (hereinafter referred to as the first problem).

Moreover, macro photography is susceptible to the ambient illumination environment, often resulting in external illumination (such as the light from fluorescent lamps in the room or from the sun) or the shadow of the camera or of the photographer photographed together (hereinafter referred to as the second problem).

Moreover, macro photography not only is susceptible to camera shake, but also requires that the camera always be kept parallel to the subject, which is difficult (hereinafter referred to as the third problem).

Moreover, in macro photography, if the subject, for example a document, has a wrinkle, bend, warp, or fold, this part of the subject is illuminated irregularly. In an extreme case, this makes the corresponding part of the photographed image out of focus and thus unsharp (hereinafter referred to as the fourth problem).

Examples of solutions to the first problem are as follows. One conventionally proposed digital camera incorporates a lamp that emits softer light than a flash. In macro photography, illumination is achieved with the light emitted from this lamp so that light is shone evenly over the entire area to be photographed (see Japanese Patent Application Laid-Open No. H4-70274). Another conventionally proposed digital camera uses the liquid crystal display incorporated therein as a planar illumination light source so that light is shone evenly over the entire area to be photographed (see Japanese Patent Application Laid-Open No. 2000-75363).

Examples of solutions to the second and third problems are as follows. One conventionally proposed photographing method uses a close-up photographing apparatus that includes a hood for shielding external light and a holder for holding a camera in a desired position relative to the subject (see Japanese Patent Application Laid-Open No. H5-158149). Another conventionally proposed photographing method uses a box that shields external light and that has an illumination device housed inside it. The subject is placed inside the box, and is photographed using a camera placed at the top of the box (see Japanese Patent Application Laid-Open No. H9-133946).

The second and third problems mentioned above can be overcome by the photographing methods proposed in Japanese Patent Applications Laid-Open Nos. H5-158149 and H9-133946 mentioned above, namely by shielding external light and by holding a camera in position. However, the first problem mentioned above cannot be overcome satisfactorily with the digital cameras proposed in Japanese Patent Applications Laid-Open Nos. H4-70274 and 2000-75363 mentioned above.

As far as the applicant of the present invention has investigated, there are no publications that propose solutions to the fourth problem mentioned above.

SUMMARY

An object of the exemplary embodiments presented herein is to provide a photographing assisting apparatus, a photographing method, and a photographing system that permit satisfactory macro photography to be performed using a photographing apparatus of any kind. More specifically, it is a first object of the exemplary embodiments to provide a photographing assisting apparatus, a photographing method, and a photographing system that permit the subject to be illuminated with more evenly distributed brightness and that permit a given illumination condition of the subject to be obtained stably. It is a second object of the exemplary embodiments to provide a photographing assisting apparatus, a photographing method, and a photographing system that can minimize the effects of a wrinkle, bend, warp, or fold in the subject even when it has one.

To achieve the first object mentioned above, according to an example embodiment, a photographing assisting apparatus that is used when a subject is photographed using a photographing apparatus is provided with:

a support portion; and a planar light source, wherein the support portion supports the photographing apparatus such that the distance between the subject and the photographing apparatus is kept fixed, and wherein the planar light source, while in a state covering the to-be-photographed area on the subject, shines light on the to-be-photographed area on the subject, and the planar light source is translucent in the direction pointing from the to-be-photographed area on the subject to the photographing apparatus.

With this construction (hereinafter referred to as the first construction), while the planar light source is in a state covering the to-be-photographed area on the subject, light is shone on the to-be-photographed area on the subject. This permits the to-be-photographed area on the subject to be illuminated evenly. Moreover, since the planar light source is translucent in the direction pointing from the to-be-photographed area on the subject to the photographing apparatus, the subject can be photographed through the planar light source. Moreover, since the support portion supports the photographing apparatus, it is easy to hold the photographing apparatus stably during photographing. This helps reduce the effects of camera shake, and makes it easy to always keep the photographing apparatus parallel to the subject.

In the first construction described above, preferably, the planar light source is in the shape of a flat plate having a top surface and a back surface, and the planar light source, while in the state covering the to-be-photographed area on the subject, emits more light through that one of the top and back surfaces thereof which is closer to the subject.

With this construction, it is possible to control the light emitted through that surface of the planar light source which is farther from the subject (the surface facing away from the subject). This prevents the light emitted from the planar light source from directly entering the photographing apparatus.

The first construction described above may be additionally provided with a subject pressing member that is translucent so that, when the planar light source is in the state covering the to-be-photographed area on the subject, the subject pressing member is located between the planar light source and the subject, and presses the to-be-photographed area on the subject.

With this construction, since the subject pressing member presses the subject, even when the subject has a wrinkle, bend, warp, or fold, it is possible to minimize its effects. Moreover, since the subject pressing member is translucent, the subject can be photographed through the subject pressing member.

In the first construction described above, the planar light source may be shared as the subject pressing member that presses the to-be-photographed area on the subject.

With this construction, it is possible to reduce the number of components, and thereby to reduce the costs.

To achieve the second object mentioned above, according to an example embodiment, a photographing assisting apparatus that is used when a subject is photographed using a photographing apparatus is provided with:

a support portion; and a subject pressing member, wherein the support portion supports the photographing apparatus such that the distance between the subject and the photographing apparatus is kept fixed, and wherein the subject pressing member is translucent, and the subject pressing member, while in a state covering the to-be-photographed area on the subject, presses the to-be-photographed area on the subject.

With this construction (hereinafter referred to as the second construction), the subject pressing member presses the subject. Thus, even if the subject has a wrinkle, bend, warp, or fold, its effects can be minimized. Moreover, since the subject pressing member is translucent, the subject can be photographed through the subject pressing member. Moreover, since the support portion supports the photographing apparatus, it is easy to hold the photographing apparatus stably during photographing. This helps reduce the effects of camera shake, and makes it easy to always keep the photographing apparatus parallel to the subject.

The second construction described above may be additionally provided with an illumination portion that illuminates the subject through the subject pressing member.

With this construction, the subject pressing member and the illumination portion can be provided separately, and can thus be optimized separately. For example, the subject pressing member can be made of a material with high wear-resistance (for example, glass); on the other hand, the illumination portion can be selected from a planar, a ring-shaped, and other types of light sources to suit specific needs. In a case where a planar light source is used as the illumination portion, since the planar light source does not make direct contact with the subject, it can be formed of a material with low wear-resistance, such as resin.

In the first or second construction described above, a light shielding portion may be additionally provided that reduces the incidence of ambient light on the to-be-photographed area on the subject.

With this construction, it is possible to reduce the influence of the ambient illumination environment, and thereby prevent external illumination (such as light from fluorescent lamps in the room or from the sun) from being photographed together.

In the first or second construction described above, the support portion may be provided with an adjustment mechanism so that the distance between the subject and the photographing apparatus can be freely adjusted.

With this construction, the photographing assisting apparatus can easily be used in combination with a variable-focal-length photographing apparatus, or with a plurality of photographing apparatuses having different focal lengths.

In the first or second construction described above, the support portion may be provided with a folding mechanism so that the volume of the photographing assisting apparatus can be made smaller when it is not in use than when in use.

With this construction, it is possible to enhance the storability and portability of the photographing assisting apparatus, making it easy to store away and carry around.

To achieve the first object mentioned above, according to an example embodiment, a photographing method using a photographing apparatus includes: a step of placing a translucent planar light source so that the planar light source covers and illuminates a subject; and a step of photographing the subject through the planar light source while the planar light source is in a state illuminating the subject.

By this photographing method, while the planar light source is in a state covering the to-be-photographed area on the subject, light is shone on the to-be-photographed area on the subject. This permits the to-be-photographed area on the subject to be illuminated evenly. Moreover, since the planar light source is translucent, the subject can be photographed through the planar light source.

To achieve the second object mentioned above, according to an example embodiment, a photographing method using a photographing apparatus includes: a step of placing a translucent subject pressing member so that the subject pressing member covers a subject; and a step of photographing the subject through the subject pressing member while the subject pressing member is in a state of pressing the subject.

By this photographing method, the subject pressing member presses the subject. Thus, even if the subject has a wrinkle, bend, warp, or fold, its effects can be minimized.

Moreover, since the subject pressing member is translucent, the subject can be photographed through the subject pressing member.

In either of the photographing methods described above, it is preferable that the subject be photographed with the photographing apparatus fixed so that the distance between the subject and the photographing apparatus is kept fixed.

By this photographing method, since the photographing apparatus is fixed, it is easy to hold the photographing apparatus stably during photographing. This helps reduce the effects of camera shake, and makes it easy to always keep the photographing apparatus parallel to the subject.

According to an example embodiment, a photographing method uses a photographing assisting apparatus having the first or second construction described above, a digital photographing apparatus supported by the support portion of the photographing assisting apparatus, and a personal computer, and includes a step of reading data of an image photographed by the photographing apparatus into the personal computer.

By this photographing method, it is possible to read the data of photographed images into the personal computer. This, as compared with data acquisition of image data using a conventional flat-bed scanner, is advantageous in reducing the processing time. Whereas a conventional flat-bed scanner can be used solely as a scanner, the method described above using a digital photographing apparatus (simply if the user possesses a digital photographing apparatus) permits it to be used both as a substitute for a document scanner and as a photographing apparatus for photographing a landscape. This is very useful.

To achieve the first object mentioned above, according to an example embodiment, a photographing system is provided with the photographing assisting apparatus of the first construction described above and a photographing apparatus.

To achieve the second object mentioned above, according to an example embodiment, a photographing system is provided with the photographing assisting apparatus of the second construction described above and a photographing apparatus.

DETAILED DESCRIPTION OF PREFERRED EMBODIMENTS

Figure 1:
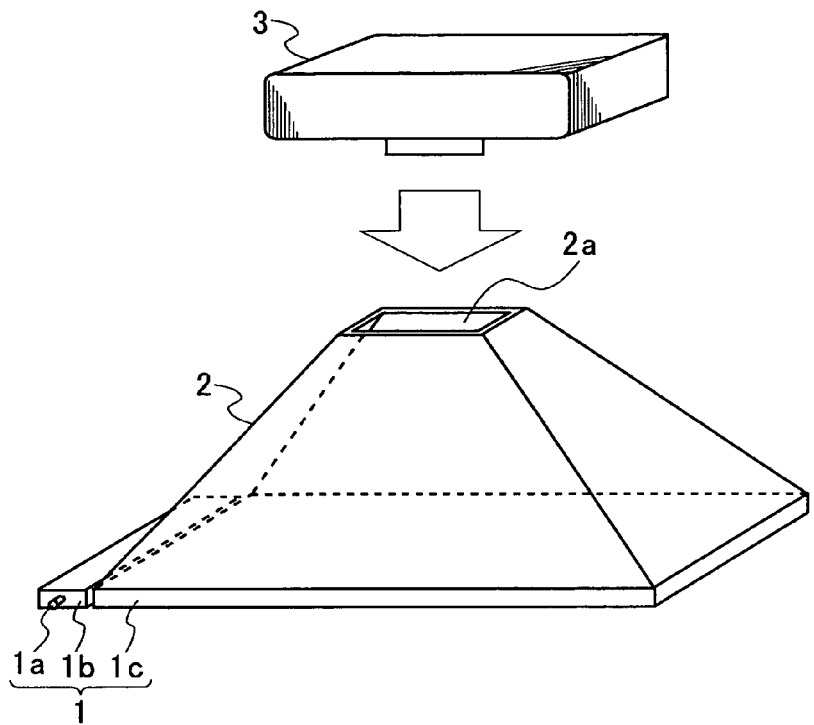
FIG. 1 is an exterior view of a photographing assisting apparatus according to an example embodiment.

FIG. 1 shows an exterior view of a photographing assisting apparatus according to an example embodiment. The photographing assisting apparatus of an example embodiment is provided with a planar light source 1 and a light-shielding hood 2. The planar light source 1 is composed of a point light source (for example, a white LED) 1a, a light guide rod 1b, and a light guide plate 1c. The point light source 1a and the light guide rod 1b are positioned relative to the light guide plate 1c. The point light source 1a may be fed with electric power from a battery provided in an end portion of the planar light source 1, or via a cable from an external power supply such as an AC adapter or personal computer, or via a connector provided to receive electric power from the power supply built in a camera.

The light-shielding hood 2 has an opening at the top end and another opening at the bottom end. The top-end opening 2a of the light-shielding hood 2 permits the lens portion of a camera 3 to be put therein. By putting the lens portion of the camera 3 in the top-end opening 2a of the light-shielding hood 2, the camera 3 can be fixed to and mounted on the photographing assisting apparatus of the invention. That is, the top-end opening 2a functions as a support member that supports the camera 3 such that the distance from the subject, placed on the bottom surface of the light guide plate 1c, to the camera 3 is kept fixed. The camera 3 may be fixed more firmly by putting an engagement portion provided on the part of the camera into engagement with an engagement portion provided at the top of the light-shielding hood 2.

The bottom-end opening of the light-shielding hood 2 is approximately the same size as the top surface of the light guide plate 1c. The planar light source 1 and the light-shielding hood 2 are bonded together so that the bottom-end opening of the light-shielding hood 2 coincides with the top surface of the light guide plate 1c.

The light-shielding hood 2 shields external light so that the area to be photographed on the subject, which is placed on the bottom surface of the light guide plate 1c, is not illuminated with light other than that emitted from the planar light source 1. The light-shielding hood 2 is formed of a sheet of metal, such as aluminum or titanium, or a sheet of light-shielding resin. For more effective light shielding, it is preferable that the interior surface of the light-shielding hood 2 be made black.

The light-shielding hood 2 does not necessarily have to shield external light completely; it has only to reduce the incidence of external light so as to minimize the effect of external illumination (such as the light from fluorescent lamps in the room or from the sun) being photographed together. Thus, the light-shielding hood 2 may be made translucent to some degree (for example, by forming the light-shielding hood 2 out of a semitransparent material). This advantageously permits the user to confirm the position of the area to be photographed through the light-shielding hood. Even if the light-shielding hood 2 is formed of a transparent material such as a plate of acrylic resin, the reflection that takes place on the surface of the light-shielding hood 2 considerably reduces the incidence of external light. Thus, the light-shielding hood 2 may be transparent.

Figure 6:
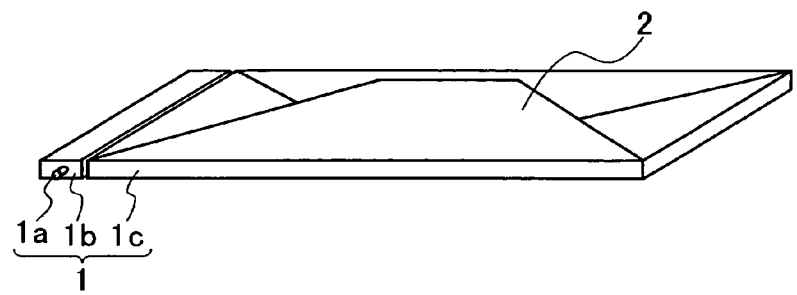
FIG. 6 is an exterior view of a photographing assisting apparatus according to an example embodiment, with the light-shielding hood folded down.

The light-shielding hood 2 may be formed as a single-piece member. For easy storage and carrying around, however, it is preferable that the light-shielding hood 2 be so structured that it can be folded down when not in use. When light-shielding hood 2 is so structured that it can be folded down, the photographing assisting apparatus of the invention, with the light-shielding hood 2 folded down, has an external appearance as shown in FIG. 6. In FIG. 6, such components as are found also in FIG. 1 are identified with common reference numerals, and their detailed explanations will not be repeated.

Figure 7A:
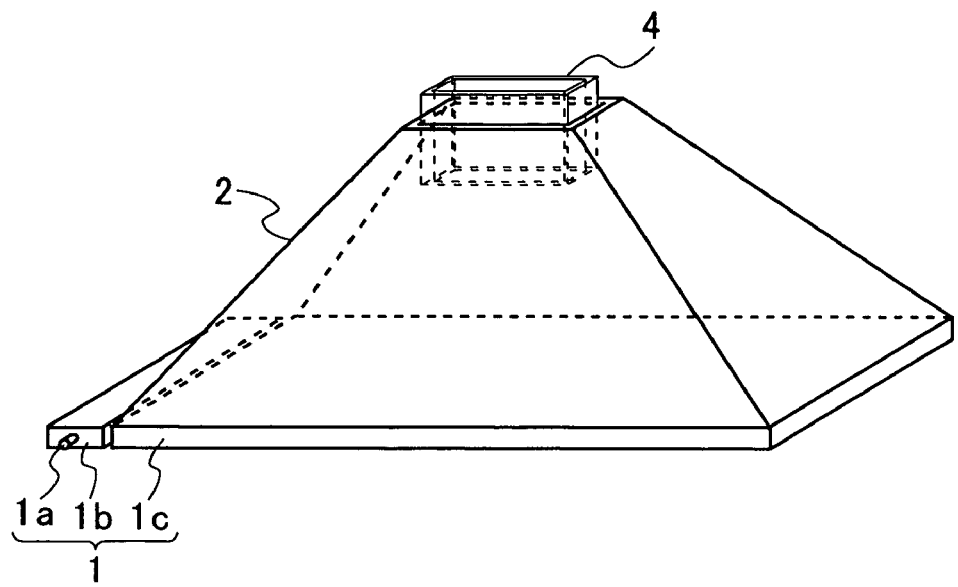
FIG. 7A is an exterior view of a photographing assisting apparatus according to an example embodiment, with an adjustable support member for use with a camera having a short focal length.
Figure 7B:
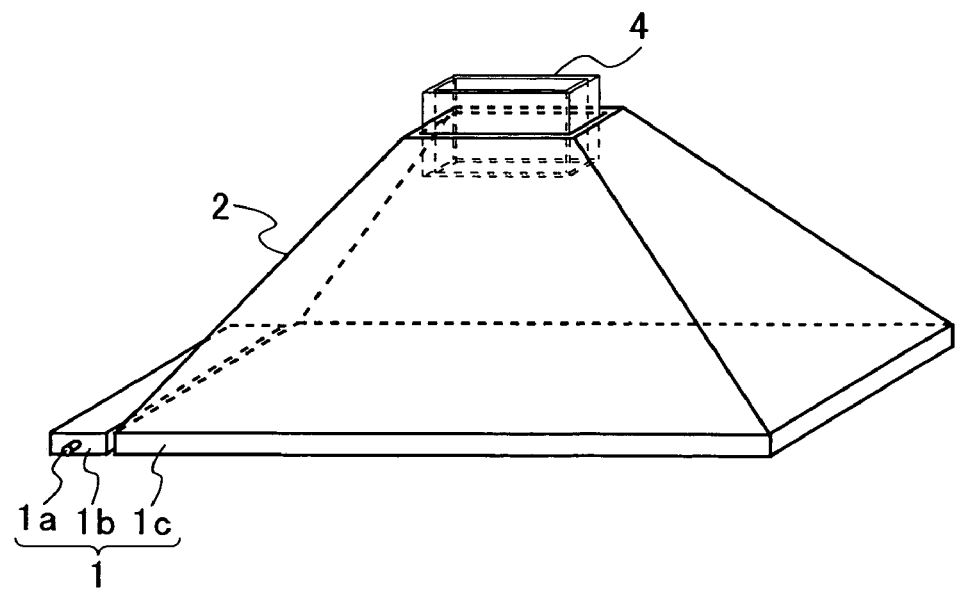
FIG. 7B is an exterior view of a photographing assisting apparatus according to an example embodiment, with an adjustable support member for use with a camera having a long focal length.

In the photographing assisting apparatus of an example embodiment shown in FIG. 1, the distance from the subject to the camera is fixed. It is, however, preferable that a photographing assisting apparatus according to the invention be provided with a mechanism that permits the distance from the subject to the camera to be adjusted freely. An example of a photographing assisting apparatus according to an example embodiment that permits the distance from the subject to the camera to be adjusted freely is shown in FIGS. 7A and 7B. In FIGS. 7A and 7B, such components as are found also in FIG. 1 are identified with common reference numerals, and their detailed explanations will not be repeated.

The photographing assisting apparatus of an example embodiment shown in FIGS. 7A and 7B is provided with a support member 4. The support member 4 is fitted into the top-end opening of the light-shielding hood 2, can be slid perpendicularly to the light-shielding hood 2 to be stopped at a desired level, and permits the lens portion of a camera to be put in the opening at the top end thereof. With this construction, even in a case where a plurality of cameras having different focal lengths are interchangeably used, it is possible to cope with them by appropriately sliding the support member 4 and thereby adjusting the distance between the subject and the camera. For example, when the photographing assisting apparatus is used in combination with a camera having a short focal length, it is brought into a state as shown in FIG. 7A; when it is used in combination with a camera having a long focal length, it is brought into a state as shown in FIG. 7B.

Figure 2A:
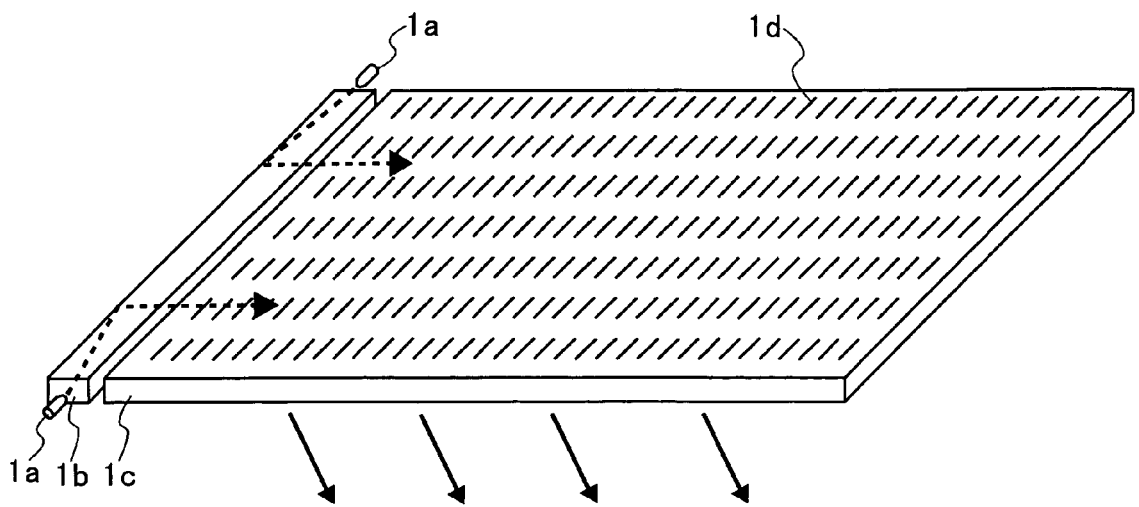
FIG. 2A is an exterior view of a planar light source provided in a photographing assisting apparatus according to an example embodiment.
Figure 2B:
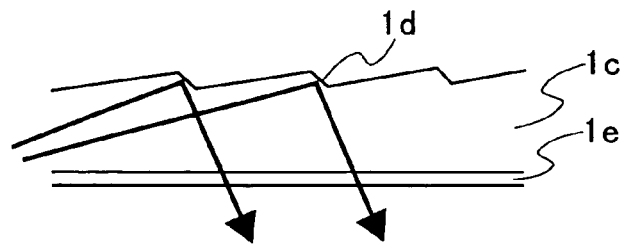
FIG. 2B is an enlarged partial sectional view of the light guide plate provided in the planar light source shown in FIG. 2A.

Now, with reference to an external view of the planar light source shown in FIG. 2A and an enlarged partial sectional view of the light guide plate shown in FIG. 2B, the structure of the planar light source 1 and the principle of how it emits light will be described. In FIGS. 2A and 2B, such components as are found also in FIG. 1 are identified with common reference numerals.

The light emitted from the point light sources 1a is spread one-dimensionally by the light guide rod 1b, and then enters the light guide plate 1c through one side surface thereof.

The light guide plate 1c is a substantially rectangular flat plate made of a transparent material such as acrylic resin, and has a large number of prisms 1d on the top surface thereof. The inclination angles of the reflective surfaces of the prisms 1d are so determined as to permit the light that is guided through the interior of the light guide plate 1c by total reflection to exit out of it efficiently through the bottom surface of the light guide plate 1c. In this embodiment, the shape of the prisms 1d is formed on a mold for injection molding in advance so that, when the light guide plate 1c is formed by injection molding, the prisms 1d are formed simultaneously. It is, however, also possible to form the prisms on a transparent sheet and then bond the sheet to a light guide plate having no prisms formed thereon, with adhesive sandwiched in between.

The light that has exited from the light guide rod 1b and then entered the light guide plate 1c travels through the interior of the light guide plate 1c by being totally reflected repeatedly. When the light traveling inside the light guide plate 1c reaches the reflective surfaces of the prisms 1d, it is reflected therefrom, with the result that the reflected light exits out of the light guide plate 1c through the bottom surface thereof.

In this way, light is emitted efficiently through the bottom surface of the light guide plate 1c, with no light, or only so small an amount of light as to be regarded as simply leaking, emitted from the top surface of the light guide plate 1c.

Moreover, since the light guide plate 1c is made of a transparent material such as acrylic resin, it transmits intact the light that enters it through the bottom surface of the light guide plate 1c. Furthermore, in this embodiment, to reduce the loss of light attributable to the interfacial reflection that occurs when external light enters the light guide plate 1c through the bottom surface thereof, an anti-reflection film 1e is provided on the bottom surface of the light guide plate 1c. Whether or not to provide this anti-reflection film 1e is decided to suit specific needs.

In this embodiment, the provision of the light guide rod 1b helps increase beforehand the evenness of the light that enters the light guide plate 1c. This helps enhance the planar evenness of the light emitted from the light guide plate. The light guide rod may be omitted, in which case the light emitted from a point light source is made to directly enter the light guide plate. To obtain higher planar evenness in the light emitted from the light guide plate, however, it is preferable to provide a light guide rod as in this embodiment.

Figure 3:
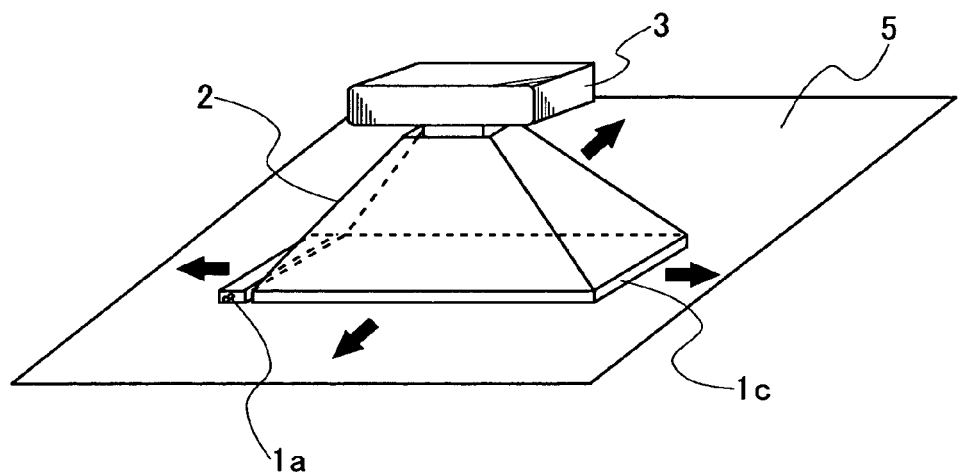
FIG. 3 is a diagram showing an example of how a photographing assisting apparatus according to an example embodiment is used.

Next, how to use the photographing assisting apparatus shown in FIG. 1 will be described. FIG. 3 shows an example of how the photographing assisting apparatus shown in FIG. 1 is used. In FIG. 3, such components as are found also in FIG. 1 are identified with common reference numerals, and their detailed explanations will not be repeated.

Here, the subject 5 to be photographed is a document (for example, a book, newspaper, magazine, or business card). The photographer places the photographing assisting apparatus of the invention on top of the subject 5. Here, the photographing assisting apparatus of the invention is so placed that the light guide plate 1c covers the area to be photographed on the subject 5. Incidentally, the light guide plate 1c also serves as a subject pressing member for pressing the area to be photographed on the subject 5. The photographer fixes a camera 3 to the photographing assisting apparatus of the invention with the lens portion of the camera 3 put in the top-end opening of the light-shielding hood 2. In this state, when the point light sources 1a are lit, light is emitted out of the light guide plate 1c through the bottom surface thereof so as to appropriately illuminate the area to be photographed on the subject 5, which is placed beneath the light guide plate 1c. The photographer then adjusts the focus of the camera 3 to the area to be photographed on the subject 5, and then photographs the area to be photographed on the subject 5.

By this example photographing method, the area to be photographed on the subject 5 is illuminated with the planar light source 1 that is so placed as to cover the area to be photographed on the subject 5. This, as compared with conventional photographing methods whereby the subject is illuminated with a flash light source (including a soft flash) or a light source using a liquid crystal display, makes it possible to evenly illuminate the entire area to be photographed, and thus helps prevent uneven exposure.

Moreover, the light-shielding hood 2 prevents the area to be photographed from being illuminated with ambient light. This reduces the effects of the ambient illumination environment such as external illumination (such as the light from fluorescent lamps in the room or from the sun) being photographed together. Moreover, the camera 3 is fixed in position by the top-end opening of the light-shielding hood 2, which serves as a support member. This eliminates the effects of camera shake, and makes it easy to always keep the camera 3 parallel to the subject 5. Moreover, the light guide plate 1c presses the area to be photographed on the document, i.e., the subject 5. Thus, even if the document, i.e., the subject 5, has a wrinkle, bend, warp, or fold in the area to be photographed thereon, it is possible to minimize its effects.

Even though the light-shielding hood 2 may prevent direct visual checking of the state of the area to be photographed, this does not cause serious problems in practice because the state of the subject 5 can be checked via a viewfinder or a monitor display built in the camera. In a case where the light-shielding hood 2 is made somewhat translucent or where it is made transparent, the area to be photographed can be directly checked visually through the light-shielding hood.

In macro (close-up) photography, the photographing position often needs to be fine-adjusted. For the fine-adjustment of the photographing position, the photographing assisting apparatus of the invention often needs to be moved forward, backward, leftward, and rightward. This makes the bottom surface of the light guide plate 1c liable to wear and being scarred. This tendency is particularly remarkable in a case where the light guide plate 1c is formed of resin such as acrylic resin.

It is possible to reduce the wear and scarring of the bottom surface of the light guide plate 1c, for example, by forming the light guide plate 1c out of a hard material such as a glass plate, or by bonding to the bottom surface of the planar light source 1 a translucent protective plate (of glass, for example) to prevent direct contact between the planar light source 1 and the subject.

Figure 4:
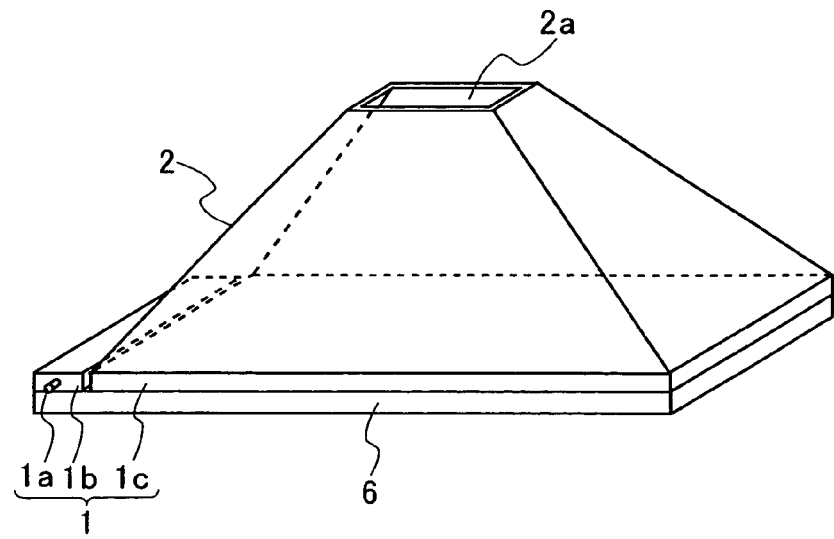
FIG. 4 is an exterior view of a photographing assisting apparatus, provided with a protective plate, according to an example embodiment.

In practical terms, the former method requires that prisms be formed on a glass plate and thus leads to higher costs. By contrast, the latter method is free from such inconveniences and is therefore useful. FIG. 4 shows an exterior view of a photographing assisting apparatus according to an example embodiment that adopts the latter method. In FIG. 4, such components as are found also in FIG. 1 are identified with common reference numerals, and their detailed explanations will not be repeated. The photographing assisting apparatus shown in FIG. 4 is provided with a protective plate 6 that is bonded to the bottom surface of the planar light source. Here, the protective plate 6 also functions as a subject pressing member.

Incidentally, for the purpose of minimizing the effects of a wrinkle, bend, warp, or fold in a case where the subject has one in the area to be photographed thereon, the planar light source 1 is not necessarily an essential component. From the photographing assisting apparatus constructed as shown in FIG. 4, the planar light source 1 may be omitted, in which case the light-shielding hood 2 is fixed directly to the protective plate 6 and a ring-shaped light source or the like placed at a small distance from the subject is used instead of a planar light source. For more even illumination of the subject, however, it is preferable to use a planar light source.

A photographing assisting apparatus according to an example embodiment can be used in combination with any type of camera; when combined with a digital camera, it substitutes for a desk-top image scanner.

Figure 5:
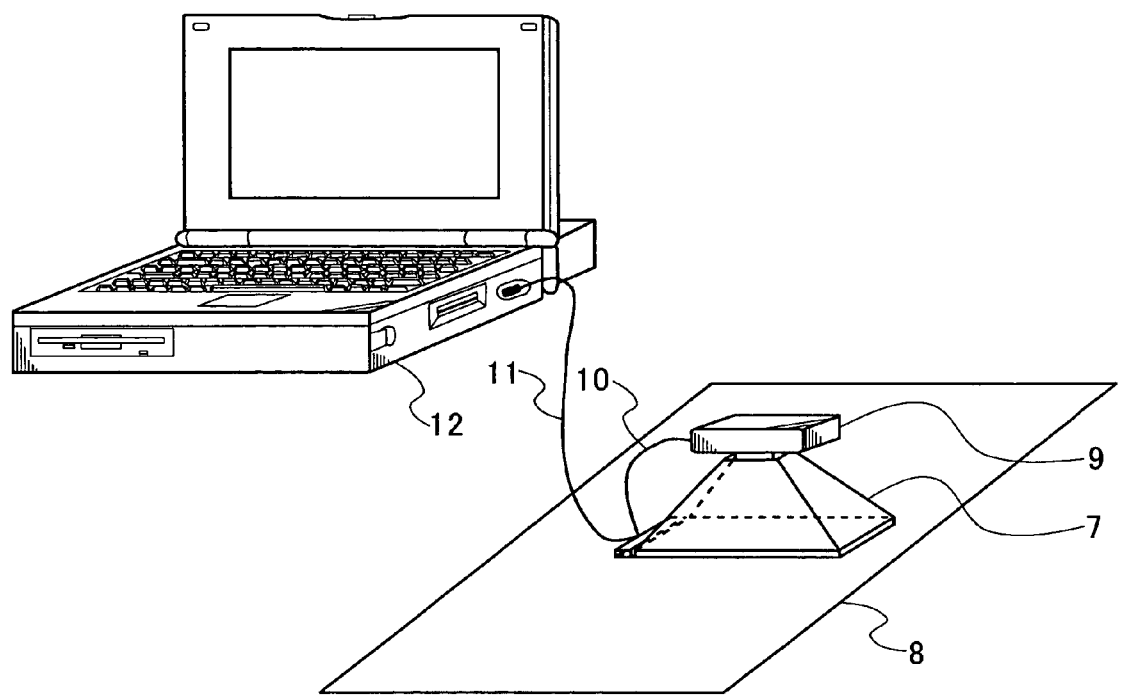
FIG. 5 is a diagram showing an example of how a photographing assisting apparatus according to an example embodiment is used in combination with a digital camera to substitute for a desk-top image scanner.

FIG. 5 shows how a document is photographed using a digital camera and a photographing assisting apparatus according to an example embodiment and how the data of the photographed image is then fed into a personal computer.

A photographing assisting apparatus 7 according to an example embodiment is placed on top of a document 8 so as to cover the area to be photographed on the document 8. Moreover, a digital camera 9 is fixed to the photographing assisting apparatus 7 of an example embodiment, with the lens portion of the digital camera 9 put in the top-end opening of the light-shielding hood provided in the photographing assisting apparatus 7 of an example embodiment.

The photographing assisting apparatus 7 of an example embodiment and the digital camera 9 are each famished with a USB interface. The photographing assisting apparatus 7 of an example embodiment is connected via a USB cable 11 to a personal computer 12. This permits the planar light source provided in the photographing assisting apparatus 7 of an example embodiment to be fed with electric power from the personal computer 12. On the other hand, the digital camera 9 is connected via a USB cable 10 and then the USB cable 11 to the personal computer 12. This permits the data of an image photographed with the digital camera 9 to be immediately fed into the personal computer 12. Although this embodiment deals with a case where USB interfaces are used, it is also possible to adopt interfaces of any other type (for example, wireless interfaces).

By using this example method, it is possible to substitute for a flat-bed scanner known as a personal computer peripheral device for the purpose of feeding image data into a personal computer. Whereas a conventional flat-bed scanner reads two-dimensional information by mechanically scanning a one-dimensional linear sensor, the method described above achieves photographing using a digital camera employing a two-dimensional image sensor (such as a CCD or CMOS). This provides the benefit of reducing the processing time. Moreover, whereas a conventional flat-bed scanner can be used exclusively as a scanner, the using method described above, simply if the user possesses a digital camera, permits it to be used both as a substitute for a scanner and as a photographing apparatus for photographing a landscape. This is very useful.

What is claimed is:

1. A photographing assisting apparatus for use when a subject is photographed using a photographing apparatus, the photographing assisting apparatus comprising:
    a support portion; and
    a planar light source,
    wherein the support portion supports the photographing apparatus such that a distance between the subject and the photographing apparatus is kept fixed, and
    wherein the planar light source, while in a state covering a to-be-photographed area on the subject, shines light on the to-be-photographed area on the subject, and
    wherein the planar light source is translucent,
    wherein the planar light source is in a shape of a flat plate having a top surface and a back surface, and the planar light source, while in the state covering the to-be-photographed area on the subject, emits more light through that one of the top and back surfaces thereof which is closer to the subject.

2. A photographing assisting apparatus for use when a subject is photographed using a photographing apparatus, the photographing assisting apparatus comprising:
    a support portion; and
    a planar light source,
    wherein the support portion supports the photographing apparatus such that a distance between the subject and the photographing apparatus is kept fixed, and
    wherein the planar light source, while in a state covering a to-be-photographed area on the subject, shines light on the to-be-photographed area on the subject, and wherein the planar light source is translucent, a subject pressing member that is translucent, wherein, when the planar light source is in the state covering the to-be-photographed area on the subject, the subject pressing member is located between the planar light source and the subject, and presses the to-be-photographed area on the subject.

3. The photographing assisting apparatus of claim 1, wherein the planar light source presses the to-be-photographed area on the subject.

4. The photographing assisting apparatus of claim 1, further comprising:

a light shielding portion that reduces incidence of ambient light on the to-be-photographed area on the subject.

5. The photographing assisting apparatus of claim 1:

wherein the support portion has an adjustment mechanism that permits the distance between the subject and the photographing apparatus to be freely adjusted.

6. The photographing assisting apparatus of claim 1;

wherein the support portion has a folding mechanism that permits a volume of the photographing assisting apparatus to be made smaller when the photographing assisting apparatus is not in use than when in use.

7. A photographing method using a photographing apparatus, comprising:

placing a translucent planar light source so that the planar light source covers and illuminates at least an area of a subject; and photographing the subject through the planar light source while the planar light source is in a state of illuminating the subject.

8. The photographing method of claim 7, wherein the subject is photographed with the photographing apparatus fixed so that a distance between the subject and the photographing apparatus is kept fixed.

9. A photographing assisting apparatus for use when a subject is photographed using a photographing apparatus, the photographing assisting apparatus comprising:

a support portion; and a planar light source, wherein the support portion supports the photographing apparatus such that a distance between the subject and the photographing apparatus is kept fixed, wherein the planar light source, while in a state covering a to-be-photographed area on the subject, shines light on the to-be-photographed area on the subject, and wherein the planar light source is translucent, and wherein said planar light source is in substantial contact with said subject across the to-be-photographed area of said subject.

10. The photographing assisting apparatus of claim 2:

wherein the support portion has an adjustment mechanism that permits the distance between the subject and the photographing apparatus to be freely adjusted.

11. The photographing assisting apparatus of claim 2, further comprising:

wherein the support portion has a folding mechanism that permits a volume of the photographing assisting apparatus is not in use than when in use.

* * * * *